United States Patent
Schilz et al.

(10) Patent No.: US 10,018,510 B2
(45) Date of Patent: Jul. 10, 2018

(54) MOTION AND PRESENCE DETECTOR

(71) Applicant: Excelitas Technologies Singapore PTE Ltd., Singapore (SG)

(72) Inventors: Juergen Schilz, Niedernhausen (DE); Arthur John Barlow, Alton (GB); Wolfgang Schmidt, Wiesbaden (DE)

(73) Assignee: Excelitas Technologies Singapore Pte. Ltd., Singapore (SG)

( * ) Notice: Subject to any disclaimer, the term of this patent is extended or adjusted under 35 U.S.C. 154(b) by 236 days.

(21) Appl. No.: 15/004,183

(22) Filed: Jan. 22, 2016

(65) Prior Publication Data

US 2016/0138976 A1    May 19, 2016

Related U.S. Application Data

(63) Continuation-in-part of application No. 13/867,356, filed on Apr. 22, 2013, now Pat. No. 9,377,365.

(51) Int. Cl.
| | |
|---|---|
| *G01J 5/12* | (2006.01) |
| *G01J 5/00* | (2006.01) |
| *G08B 13/193* | (2006.01) |

(52) U.S. Cl.
CPC ............. *G01J 5/12* (2013.01); *G01J 5/0025* (2013.01); *G08B 13/193* (2013.01)

(58) Field of Classification Search
CPC .......... G01J 5/12; G01J 5/0025; G08B 13/193
See application file for complete search history.

(56) References Cited

U.S. PATENT DOCUMENTS

| | | |
|---|---|---|
| 4,722,612 A | 2/1988 | Junkert et al. |
| 5,567,052 A | 10/1996 | Yoshiike |
| 5,567,942 A | 10/1996 | Lee |

(Continued)

FOREIGN PATENT DOCUMENTS

| | | |
|---|---|---|
| CN | 101268345 A | 9/2008 |
| CN | 102472030 A | 5/2012 |

(Continued)

OTHER PUBLICATIONS

Liddiard, Kevin; New Design Enhancements for Microbolometer PIR Security Sensors; Proc. of SPIE vol. 7854, Oct. 18, 2010.

(Continued)

*Primary Examiner* — Lisa Caputo
*Assistant Examiner* — Philip Cotey
(74) *Attorney, Agent, or Firm* — Peter A. Nieves; Sheehan Phinney Bass & Green PA

(57) ABSTRACT

An apparatus configured to sense presence and motion in a monitored space is presented. The apparatus includes a dual-element assembly with a first thermal sensing element and a second thermal sensing element configured to produce a direct current output that is sustained at a level substantially proportional to an amount of thermal energy being received at the thermal sensing elements. A lens array (or equivalent optics) is coupled to the elements, having a plurality of lenses directing incident thermal energy from a plurality of optically-defined spatial zones onto the sensing elements. An electronic circuitry is configured to read a resulting signal of the dual-element assembly and an individual output signal of each the first thermal sensing element and the second thermal sensing element.

17 Claims, 12 Drawing Sheets

(56) References Cited

U.S. PATENT DOCUMENTS

| | | |
|---|---|---|
| 5,886,821 A | 3/1999 | Sohn |
| 5,973,594 A | 10/1999 | Baldwin |
| 6,037,594 A | 3/2000 | Claytor |
| 6,203,194 B1 | 3/2001 | Beerwerth |
| 6,204,502 B1 | 3/2001 | Guilmain |
| 6,215,399 B1 * | 4/2001 | Shpater .............. G08B 13/191 |
| | | 250/340 |
| 6,307,200 B1 * | 10/2001 | Kuhnly .................. G01J 5/10 |
| | | 250/338.1 |
| 6,690,018 B1 | 2/2004 | Barone |
| 2002/0063217 A1 | 5/2002 | Barone |
| 2005/0236572 A1 * | 10/2005 | Micko .................. G01V 8/10 |
| | | 250/342 |
| 2006/0087430 A1 | 4/2006 | Zambon |
| 2007/0063145 A1 | 3/2007 | Kierse et al. |
| 2007/0295813 A1 | 12/2007 | Kotlarsky |
| 2008/0025571 A1 * | 1/2008 | Nakao ................ H04N 5/3415 |
| | | 382/107 |
| 2008/0074252 A1 | 3/2008 | Micko |
| 2008/0290173 A1 | 11/2008 | Kotlarsky |
| 2009/0242769 A1 | 10/2009 | Luterotti |
| 2009/0302220 A1 * | 12/2009 | Micko ................ G08B 13/191 |
| | | 250/338.3 |
| 2010/0237248 A1 | 9/2010 | Walters |
| 2010/0270470 A1 | 10/2010 | Sasaki et al. |
| 2010/0277040 A1 * | 11/2010 | Klee .................... B06B 1/0292 |
| | | 310/324 |
| 2011/0210253 A1 * | 9/2011 | Micko .................. G01J 5/0022 |
| | | 250/349 |
| 2012/0038778 A1 | 2/2012 | Klager |
| 2013/0043396 A1 | 2/2013 | Shpater |
| 2013/0214166 A1 | 8/2013 | Barlow |
| 2014/0314123 A1 | 10/2014 | Schilz et al. |
| 2014/0346324 A1 | 11/2014 | Pai |

FOREIGN PATENT DOCUMENTS

| | | |
|---|---|---|
| EP | 2797060 | 10/2014 |
| TW | M 434177 U | 7/2012 |

OTHER PUBLICATIONS

Hashimoto K, et al High Performance Human Information Sensor: Sensors and Actuators A, Elsevier Sequoia S.A., Lausanne, CH vol. 79, No. 1, Jan. 25, 2000.

Extended European Search Report for European Application 14164912.9 dated Aug. 13, 2014.

* cited by examiner

MOTION AND PRESENCE DETECTOR

CROSS-REFERENCE TO RELATED APPLICATIONS

This application is a continuation-in-part of and claims the benefit of copending U.S. patent application Ser. No. 13/867,356, filed Apr. 22, 2013, entitled "THERMAL SENSOR MODULE WITH LENS ARRAY," which is incorporated by reference herein in its entirety.

FIELD OF THE INVENTION

The present application relates to a thermal sensor module with a lens array and, more particularly, to a thermal sensor module that produces a direct current (D.C.) output based on the incident thermal energy that passes through the lens array.

BACKGROUND

A motion detector is a device that detects moving objects, particularly people. A motion detector is often integrated as a component of a system that automatically performs a task or alerts a user of motion in an area. Motion detectors can form an important part of a security system, automated lighting control system, home control system, and other systems.

Motion detectors usually employ pyroelectric materials to detect the movement of people in a room. A pyroelectric material generates a signal if the incoming heat radiation (from a heat source such as a person's body) changes. Mathematically, the pyroelectric detector generates an electrical signal that follows the time derivative of the incoming heat flux. Thus, if a person enters or leaves the field-of-view (FOV) of the detector, the heat flux changes and a respective signal is generated. The height of the signal is dependent on the temperature of the heat source and the so-called filling factor of the field of view.

The higher the temperature of the source and the more the source fills the FOV of the detector, the higher the resulting signal. This signal will exist only for a limited time after a heat flux change, and thus if the heat flux remains constant then no signal is generated. As such it is impossible to detect the presence or absence of a motionless warm object such as a person standing still or having left the sensor area.

The use of two differentially arranged thermal DC sensors is described, for example, by U.S. Pat. No. 4,722,612, patent to Junkert et al., directed to infrared thermometers for minimizing errors associated with ambient temperature gradients using a dual thermopile where the second thermopile is used as a compensation element. In some cases the second element is used to thermally and electrically compensate thermal drift for the main sensor, and as such the compensating device is typically blinded from the incoming radiation and only provides ambient temperature compensation.

In thermopile-based flow meters, two identical sensors may be subjected to the heat from a local heater, but on opposite sides of the heater, so that a flow of gas over the sensor-heater-sensor combination may affect the heat flow and give an output, but with inherent thermal drift compensation. Similarly pyro devices using lead zirconate titanate (PZT) may use a similar configuration to prevent DC drift but each pyro is usually illuminated by different light at different times, for example, by a lensing arrangement in front of the sensor, to produce an AC signal but suppressing the DC signal. In a typical implementation, the technology disclosed herein addresses one or more of the above mentioned deficiencies.

SUMMARY OF THE INVENTION

Embodiments of the present invention provide a dual element thermal infrared motion and presence detector. Briefly described, the present invention is directed to an apparatus configured to sense presence and motion in a monitored space. The apparatus includes a dual-element assembly with a first thermal sensing element and a second thermal sensing element configured to produce a direct current output that is sustained at a level substantially proportional to an amount of thermal energy being received at the thermal sensing elements. A lens array is coupled to the thermal sensing elements, having a plurality of lenses directing incident thermal energy from a plurality of optically-defined spatial zones onto the thermal sensing elements. An electronic circuitry is configured to read a resulting signal of the dual-element assembly and an individual output signal of each of the first thermal sensing element and the second thermal sensing element.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

DETAILED DESCRIPTION OF THE DRAWINGS

Figure 1:
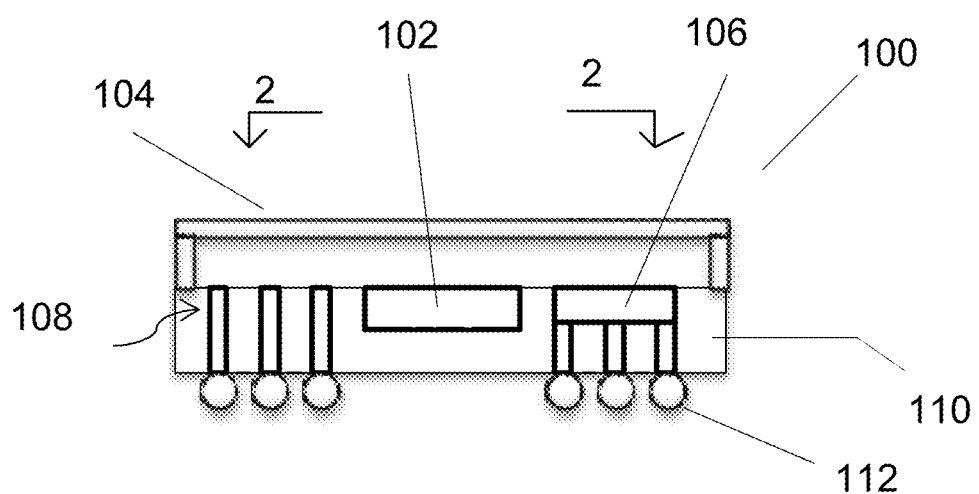
FIG. 1 is a schematic, cross-sectional side view of an exemplary detector.

FIG. 1 is a schematic, cross-sectional side view of an exemplary detector 100 configured to detect the presence, position, motion and/or direction of a living being (e.g., a human) within a monitored space. In general, the phrase "monitored space" refers to a physical area (e.g., a room, hallway, outdoor area, etc.) where the detector 100 is positioned and where the detector 100 can potentially detect the living being.

The detector 100 has a sensor module 102 with one or more thermal sensing devices (e.g., thermopiles) and a lens array 104 at least partially covering the sensor module 102. The lens array 104 has a plurality of lenses, each of which is arranged to direct incident thermal energy from the monitored space onto at least part of the sensor module 102. In some implementations, each individual lens directs incident thermal energy from one of multiple different physical zones in the monitored space onto the sensor module 102.

The lens array can be directly attached to the detector 100 as in the drawing, but it may also be mounted at a distance to the detector.

Each thermal sensing device is generally operable to produce a direct current (DC) output that is substantially proportional to an amount of thermal energy being received at that thermal sensing device. The DC output produced by a thermal sensing device remains generally constant as long as the amount of thermal energy being delivered to that thermal sensing device remains generally constant. Increases in the amount of thermal energy being delivered to the thermal sensing device will generally result in a proportional increase in the DC output being produced by that sensing device. Likewise, decreases in the amount of thermal energy being delivered to the thermal sensing device will result in a proportional decrease in the DC output being produced by that sensing device.

The DC output from the thermal sensing devices can be either a DC voltage or a DC current.

In some implementations, the thermal sensor module 102 has only one thermal sensing device (e.g., one thermopile). In general, a thermopile is an electronic device that converts thermal energy into electrical energy. It is generally composed of several thermocouples electrically connected usually in series or, less commonly, in parallel, to produce a single direct current (DC) output.

In some implementations, the thermal sensor module 102 has multiple thermal sensing devices (e.g., multiple thermopiles). In some implementations, all of the thermal sensing devices in a sensor module 102 are connected together electrically to produce a single DC output signal from the sensor module 102. In some implementations, the thermal sensing devices are configured so as to produce multiple different DC output signals from the sensor module 102.

In the illustrated implementation, the sensor module 102 is embedded within the substrate or housing 110 and the lens array 104 is supported above the sensor module 102 atop the substrate 110.

The lens array 104 can have a variety of possible configurations. For example, the lens array can include a Fresnel or other lenses, Fresnel zones, zone plates, holographic optical elements, diffractive optical elements, refractive optical elements, binary optical elements and any combination of these or any other arrangement that includes multiple lenses.

Figure 2:
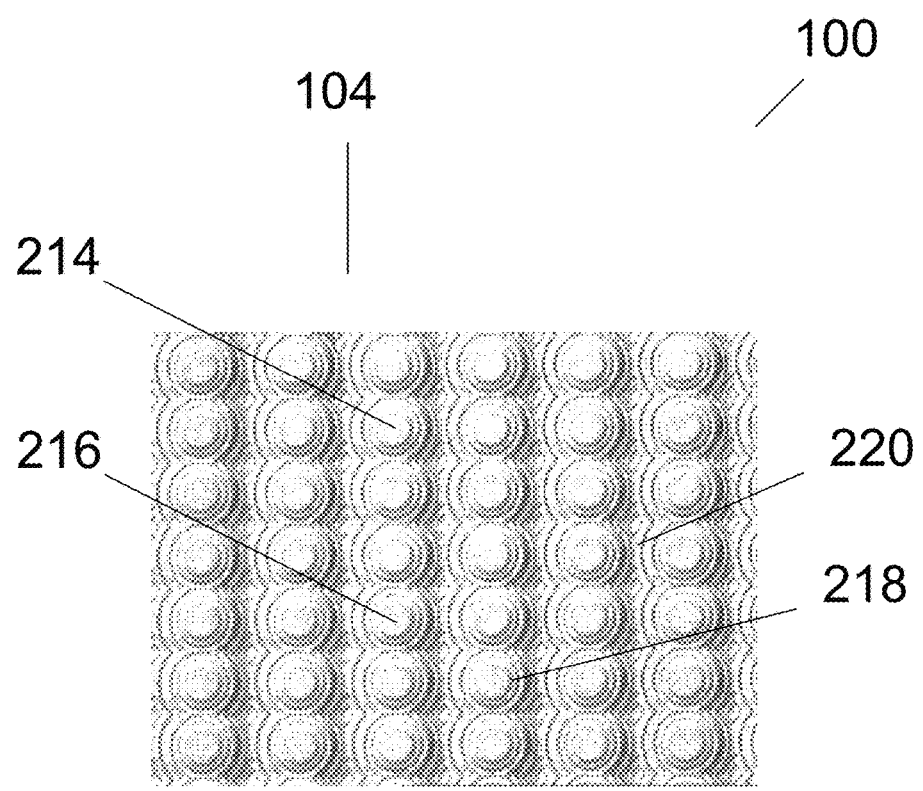
FIG. 2 is a partial top view of the detector in FIG. 1.

FIG. 2 is a partial top view of the detector 100 in FIG. 1. The illustrated view shows one exemplary implementation of the detector's lens array 104. The task of the lens array is to divide the monitored space into different segments. This segmentation is achieved by having optical elements on the lens array directing radiation only from a certain segment onto a certain thermal sensing device within the module 102. These optical elements may coincide with discrete physical regions such as in the illustrated view of FIG. 2, but can also be distributed over the lens-array surface as it may be the case by using holographic optical elements.

Each optical element typically not only divides the monitored space into segments, but also bundles radiation incident from that segment onto a specific thermal sensing device. If a person moves through a segment, the signal generated by the respective thermal sensing device starts low and reaches the maximum for a person being in the middle of the segment. If the person moves further, the signal gets smaller again. A person moving through multiple zones will thus generate a changing output pattern with maximum signal being fully within the segment and minimum signal being at the boundaries between segments.

The total number of monitored space segments may be equal or less than the number of optical regions of the lens array 2 times the number of thermal sensing devices within the module 102.

In one embodiment, the lens array 104 has alternating regions of relatively high transmissivity and relatively low transmissivity. In general, the relatively high transmissivity regions allow a relatively large fraction of incident thermal energy at a wavelength of interest to pass through to the sensor module 102, whereas the relatively low transmissivity regions allow a relatively small fraction of thermal energy at the wavelength of interest to pass through to the sensor module 102. In a further embodiment, as illustrated in FIG. 2, the central portions 216 of each lens 214 form regions producing relatively high output signals and the peripheral portions of each lens 214 and the spaces between adjacent lenses 214 form regions with relatively low output signal from the sensing device.

The alternating regions of relatively high output signal and relatively low output signal help facilitate motion detection, because the fraction of thermal energy from a person that reaches the thermal sensor module 102 beneath the lens array 104 will change as that person moves through the monitored space, for example, from a space that corresponds to the relatively high output signal region of the lens array 104 to the relatively low output signal region of the lens array 104. In effect, the lens array takes the constant thermal energy of the human and modulates it to form an alternating signal at the sensing device.

In general, the phase "wavelength of interest" refers to a wavelength (or range of wavelengths), to which the thermal sensing devices are responsive (i.e., whatever wavelengths may affect the DC output from the thermal sensing devices). In a typical implementation, the wavelength of interest will be one that corresponds to the thermal energy emitted by a living being (e.g., a human). In some implementations, the wavelength of interest is between 4 μm and 20 μm.

Referring again to FIG. 1, the illustrated detector 100 has an integrated circuit 106 that may, in various implementations, form a computer-based processor, a computer-based memory storage device and/or other circuitry to perform and/or support one or more of the functionalities described herein. Electrical conductors (e.g., traces that extend along the upper and/or lower surfaces of the substrate 110, vias 108 that extend through the substrate, solder bumps 112, etc.) are provided to connect the detector's electrical components and to connect the detector to external components.

Figure 3:
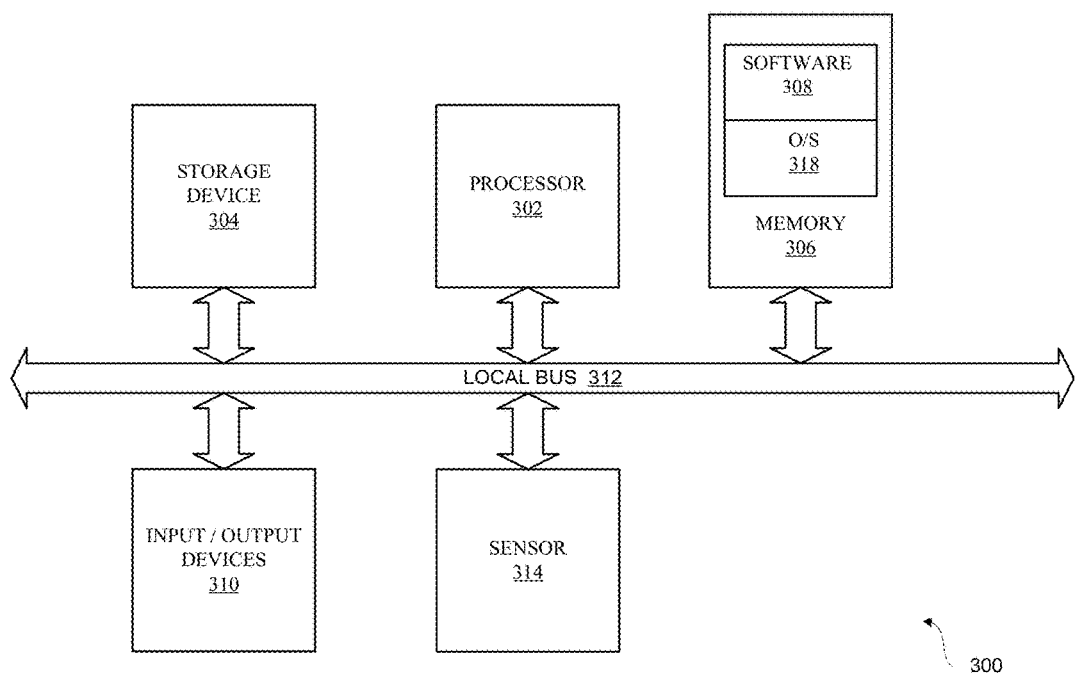
FIG. 3 is a schematic diagram showing an exemplary electrical layout of a computer system used to implement the detector of FIG. 1.

FIG. 3 is a schematic diagram showing an exemplary electrical layout of the detector 100 of FIG. 1.

The exemplary layout shows a processor 302, a storage device 304, a memory 306 having software 308 stored therein that defines at least part of the abovementioned functionalities, input and output (I/O) devices 310 (or peripherals), the sensor module 102, and a local bus, or local interface 312 allowing for communication across sub-components of the detector 100.

The local interface 312 can be, for example, one or more buses or other wired or wireless connections. The local interface 312 may have additional elements, which are omitted for simplicity, such as controllers, buffers (caches), drivers, repeaters, and receivers, to enable communications. Further, the local interface 312 may include address, control, and/or data connections to enable appropriate communications among the aforementioned subcomponents.

The processor 302 is a hardware device for executing software, such as the software stored in memory 306. The processor 302 can be any custom made or commercially available single core or multi-core processor, a central processing unit (CPU), an auxiliary processor among several processors associated with the detector 100, a semiconductor based microprocessor (in the form of a microchip or chip set), a macroprocessor, or generally any device for executing software instructions. The processor 302 can be integrated, for example, into the integrated circuitry 106 of FIG. 1.

The memory 306 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 306 may incorporate electronic, magnetic, optical, and/or other types of storage media. Note that the memory 306 can have a distributed architecture, where various components are situated remotely from one another, but can be accessed by the processor 302. The memory 306 can be integrated, for example, into the integrated circuitry 106 of FIG. 1.

In general, the software 308 includes instructions that, when executed by the processor 302, cause the processor 302 to perform one or more of the functionalities of the detector disclosed herein. The software 308 in the memory 306 may include one or more separate programs, each of which contains an ordered listing of executable instructions. The memory 306 may contain an operating system (O/S) 318. The operating system may be operable to control the execution of programs within the detector 100 and may provide scheduling, input-output control, file and data management, memory management, and communication control and related services.

The I/O devices 310 may include interfaces to external devices to allow for outputting collected data or instructions to various peripheral components. The I/O devices 310 may also facilitate uploading software and the like to the detector 100.

The sensor module 102 may be, for example, an infrared sensor or any kind of sensor that is responsive to thermal energy. The sensor module 102 may include a single element sensor or a sensor array including two or more sensor elements. A sensor array may include multiple sensor elements within a single enclosure, or may include multiple enclosures, where each enclosure includes two or more sensor elements. The sensor module 102 may be configured to detect only infrared radiation, or may be tuned to receive wider bandwidths. The sensor module 102 may further include voltage regulation and noise reduction components. The sensor module 102 may convey sensing parameters, for example, ambient temperature and the temperature of a sensed object, to the processor 302 via the local interface 312. Similarly, for an array sensor, the sensor module 102 may convey parameters for each individual array element, or may send derived parameters collated from all of the individual array sensor elements. The sensor module 102 may include an analog to digital converter, for example, to convert signals between analog and digital formats. In addition, the sensor module 102 may be configured to autonomously convey information, for example upon startup and when parameter changes are detected, or by sending periodic parameter reports. The sensor module 102 may be configured to convey parameter information when queried or polled, for example, by the processor 302.

The storage device 304 can be any type of memory storage device. In general, the storage device 304 is operable to store any data that will help the detector 100 perform one or more of the functionalities disclosed herein. The storage device 304 may be integrated into the integrated circuitry 106 in FIG. 1.

When the detector 100 is in operation, the processor 302 executes the software 308 stored in the memory 306, communicates data to and from the memory 306 and storage device 304, and generally controls operations of the detector 100. It should be noted that in some embodiments, one or more of the elements in the exemplary embodiment may not be present. Additionally, in some implementations, one or more of the elements in the exemplary embodiment may be located external to the detector 100.

Figure 4:
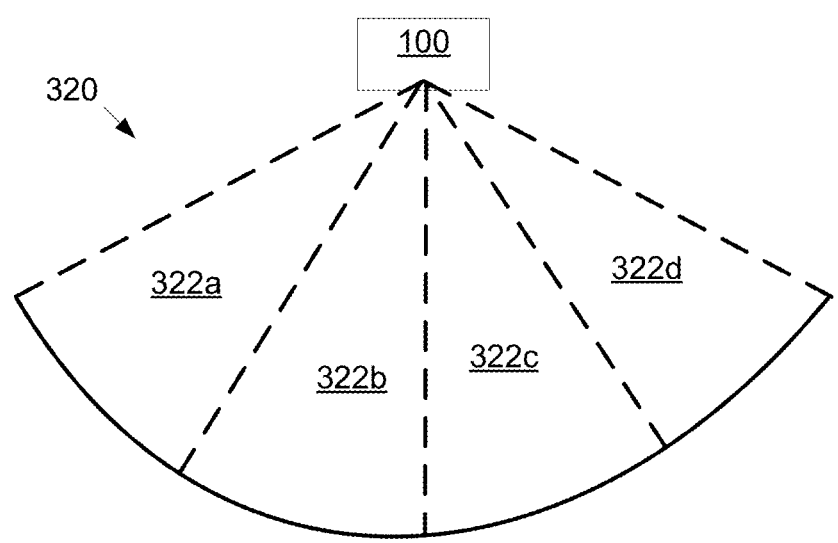
FIG. 4 is a schematic top view showing the detector of FIG. 1 positioned to monitor a space.

FIG. 4 is a schematic top view showing the detector 100 positioned to monitor a space 320 for presence, motion, position and/or direction of a person in the monitored space.

In the illustrated implementation, the lens array 104 images the sensor module 102 multiple times into the monitored space 320. Each lens in the lens array 104 is arranged to direct incident thermal energy from a respective one of a plurality of different zones in the monitored space onto the thermal sensor module 102. Thus, the lens array 104 virtually divides the monitored space into multiple different zones. In the illustrated example, the different zones 322a, 322b, 322c and 322d are virtually demarcated by dashed lines that extend out into the monitored space from the detector 100.

Each zone 322a, 322b, 322c and 322d in the illustrated example, is substantially wedge-shaped or cone-shaped, originates at the detector 100, and flares out from the detector 100 into the monitored space 320. In some implementations, each zone would extend from the floor of the monitored space to the ceiling of the monitored space. Moreover, the zones are arranged so that a person walking through the room would traverse two or more zones. In a typical implementation, each lens in the sensor's lens array would be configured to direct incident thermal energy from a corresponding one (or more) of the illustrated zones 322a, 322b, 322c and 322d onto at least part of the detector's sensor module 102.

In various implementations, the detector 100 is able to determine, based on the thermal energy received at the sensor module 102, whether a person is present within the monitored space. In some implementations, the detector 100 is able to determine, based on the thermal energy received at the sensor module 102, which one of the one or more zones 322a, 322b, 322c and 322d the person is located. In some implementations, the detector 100 is able to determine, based on the thermal energy received at the sensor module 102, whether the person is moving about within the monitored space. In some implementations, the detector 100 is able to determine, based on the thermal energy received at the sensor module 102, a direction that the person is moving within the monitored space. An example of each of these functionalities (i.e., presence detection, location, motion detection and direction detection) is described herein.

Figure 5:
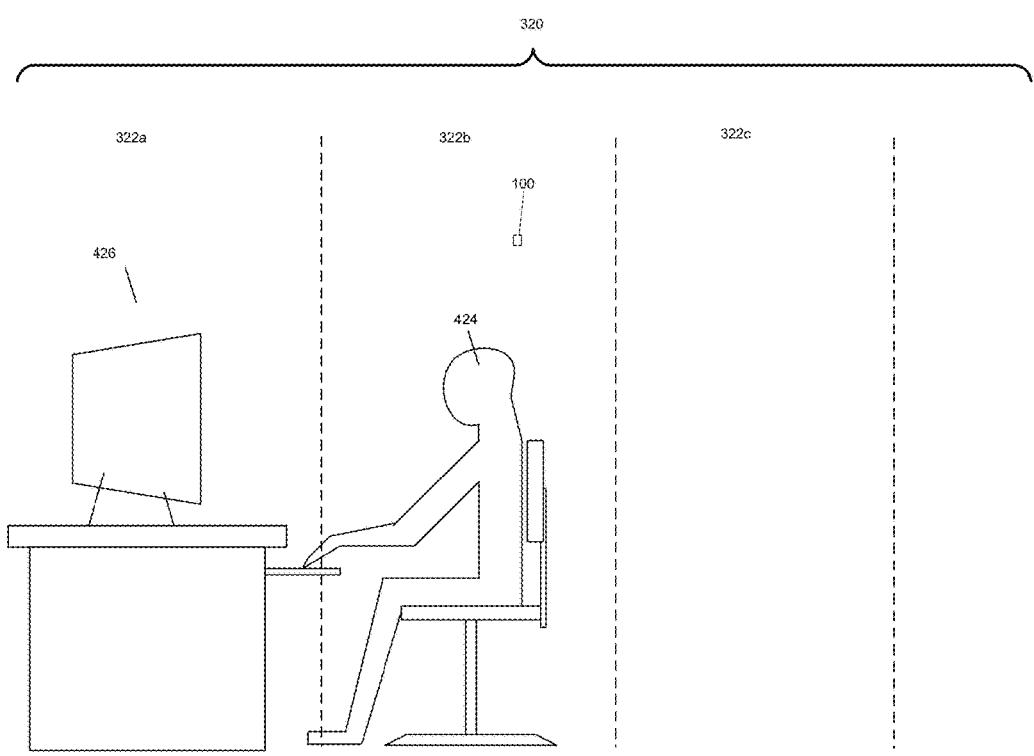
FIG. 5 is a side view of the monitored space in FIG. 4 with a substantially motionless person present.

FIG. 5 is a side view showing a person 424 sitting at a computer workstation 426 in the monitored space 320 of FIG. 4. In the illustrated example, the person 424 is seated almost entirely within zone 322*b* and, except for relatively minor movements associated with working at the computer work station 426, the person 424 can be expected to remain substantially stationary.

The detector 100, in the illustrated configuration, is mounted to a wall of the room where the person 424 and the computer work station 426 are located. As discussed herein, in some implementations, the detector 100 can detect the presence of the person 424 and, in some implementations, the detector 100 can detect the approximate location of the person 424 within the monitored space 320. The person 424 at the workstation 426 emits (i.e., radiates) an amount of thermal energy at a specific wavelength into the monitored space. In general, other items in the monitored space (e.g., the computer, etc.) will radiate thermal energy into the monitored space as well.

Figure 6:
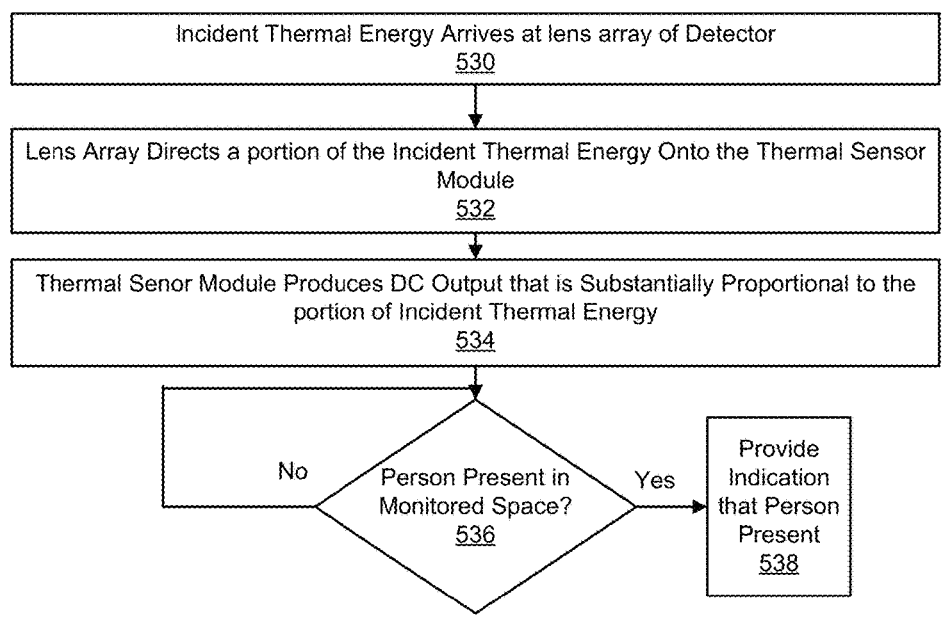
FIG. 6 is a flowchart of an exemplary process by which the detector can identify presence of a person in a monitored space.

FIG. 6 is a flowchart of an exemplary process by which the detector 100 can identify that the person in FIG. 5 is present in the monitored space 320.

According to the illustrated method, incident thermal energy (including the thermal energy from the person 424 and from the other items in the monitored space 320) travels through the room and arrives (step 530) at the lens array 104 of detector 100.

The lens array 104 directs (step 532) a portion of the incident thermal energy onto at least part of the thermal sensor module 102.

In response, the thermal sensor module 102 produces (step 534) a DC output that is substantially proportional to the portion of the incident thermal energy that is directed to the thermal sensor module 102. The DC output remains substantially constant for as long as the thermal energy being received at the thermal sensor module remains constant. Thus, the DC output would remain substantially constant for as long as the person 424 remained substantially still in the monitored space 320 and there were no other significant thermal changes in the monitored space 320.

The processor 302 (at 536) considers whether the DC output from the thermal sensor module 102 is indicative of a person being present in the monitored space 320. This determination may be accomplished, for example, by comparing the DC output with a threshold value. If so, the processor (at 538) provides an appropriate indication of its determination. This indication may be used, for example, to control various environmental aspects of the monitored space (e.g., to turn on a light in the monitored space 320).

If the processor (at 536) determines that the DC output from the one or more thermal sensing devices associated with zone 322*b* is not indicative of a person being present in the monitored space 320, then it continues monitoring.

In some implementations, the detector 100 is able to determine the approximate location of the person 424 within the monitored space 320. More particularly, in those implementations, the detector 100 may be able to determine that the person 424 is present mostly in zone 322*b* of the monitored space 320. With this information, the processor 302 may be able to control various functionalities associated (e.g., controlling a light that is in a specific zone of the monitored space).

Figure 7:
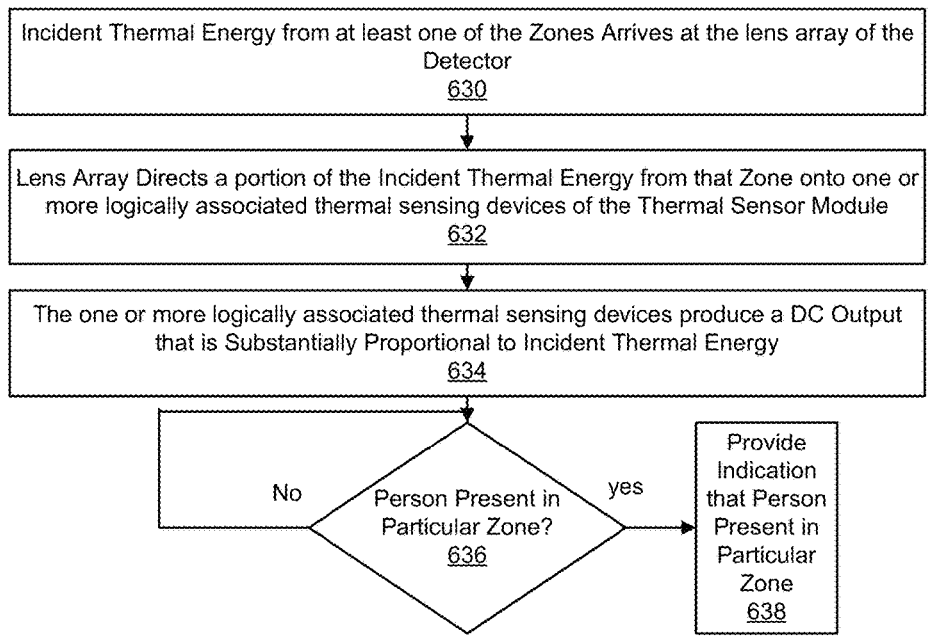
FIG. 7 is a flowchart of an exemplary process by which the detector can identify an approximate location of the person in a monitored space.

FIG. 7 is a flowchart of an exemplary process by which the detector 100 can identify in which zone in the monitored space 320 the person 424 in FIG. 5 is present.

According to the illustrated method, incident thermal energy (including the thermal energy from the person 424 and from the other items in the monitored space 320) travels through the room and arrives (step 630) at the lens array 104 of detector 100.

The lens array 104 directs (step 632) a portion of the incident thermal energy onto at least part of the thermal sensor module 102. More particularly, one or more of the lenses in the array, which correspond to zone 322*b* where the person 424 is located, direct a large portion of the incident thermal energy from that zone 322*b* onto a particular part of the thermal sensor module 102 (e.g., onto one or more particular thermal sensing devices logically associated with zone 322*b*).

At step 632, the one or more thermal sensing devices that are logically associated with zone 322*b* produce (at step 634) a DC output that is substantially proportional to the portion of the incident thermal energy that is directed to those thermal sensing devices. The DC output from those sensing devices remains substantially constant for as long as the thermal energy being received at those thermal sensing devices remains constant. Thus, the DC output remains substantially constant for as long as the person 424 remains substantially still in zone 322*b* of the monitored space 320 and there is no other significant thermal changes in zone 322*b*.

The processor 302 (at 636) considers whether the DC output from the one or more thermal sensing devices associated with zone 322*b* is indicative of a person being present in zone 322*b*. This determination may be accomplished, for example, by comparing the DC output with a threshold value. If so, the processor (at 638) provides an appropriate indication of its determination. This indication may be used, for example, to control various environmental aspects of the zone 322*b* (e.g., to turn on a light in zone 322*b*).

If the processor (at 636) determines that the DC output from the one or more thermal sensing devices associated with zone 322*b* is not indicative of a person being present in zone 322*b*, then it continues monitoring.

In some implementations, the detector 100 of FIG. 1 is configured to detect motion by a living being (e.g., a person) throughout a monitored space (e.g., 320).

Figure 8:
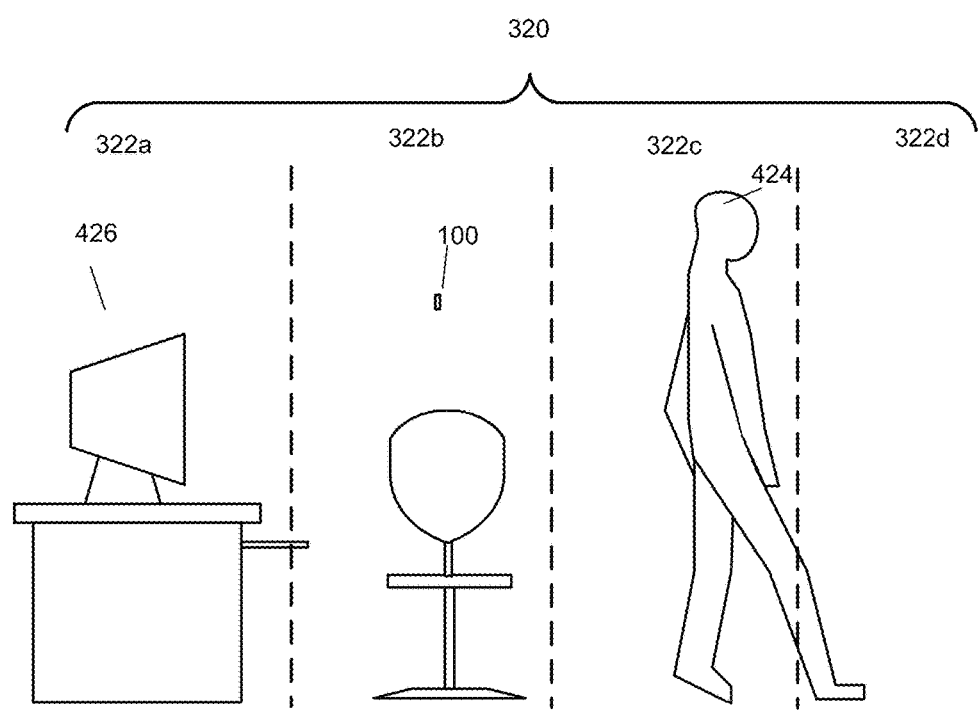
FIG. 8 is a side view of the monitored space in FIG. 4 showing a person moving through the monitored space.

FIG. 8 is a side view showing the person 424, who was sitting at a computer workstation 426 in FIG. 5, standing and having walked from zone 322*b* to zone 322*c*. The detector 100 is mounted to the wall of the room where the person 424 is walking.

As discussed herein, in some implementations, the detector 100 is configured so that it can detect the person's motion throughout the monitored space 320 (FIGS. 4, 8). The person 424 emits (i.e., radiates) an amount of thermal energy at a specific wavelength into the monitored space. In general, other items in the monitored space (e.g., the computer, etc.) will radiate thermal energy into the monitored space as well.

Figure 9:
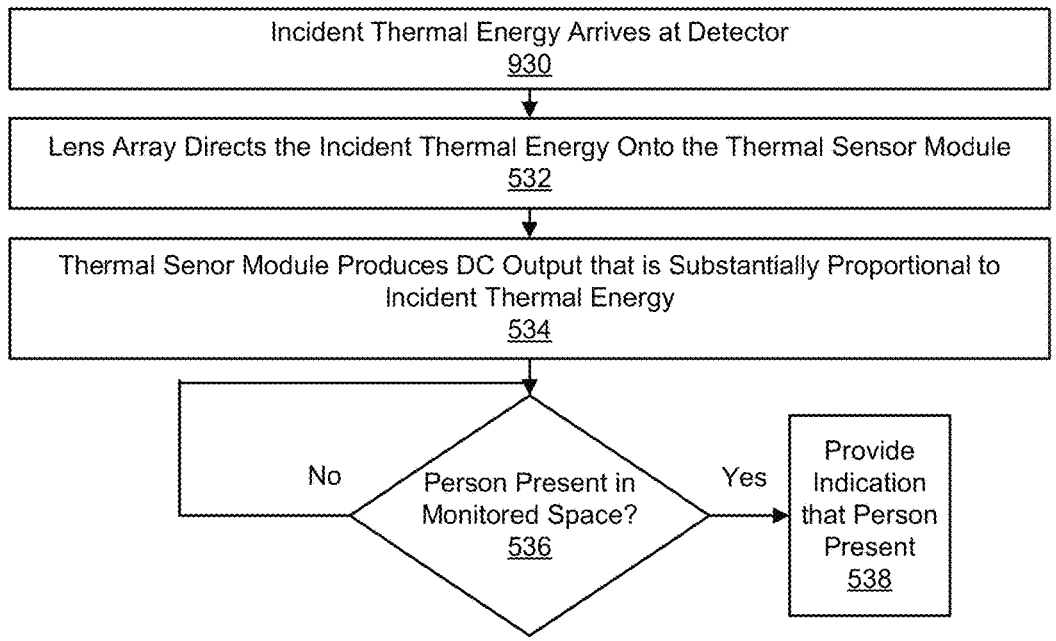
FIG. 9 is a flowchart of an exemplary process by which the detector can identify that the person in FIG. 8 is moving.

FIG. 9 is a flowchart of an exemplary process by which the detector 100 can identify that the person in FIG. 8 is moving through the monitored space 320 (FIGS. 4, 8). Incident thermal energy arrives at the detector 100, as shown by block 930. The detector lens array directs the incident thermal energy onto the thermal sensor module, as shown by block 532. The thermal senor module produces DC output that is substantially proportional to the incident thermal energy, as shown by block 534. If a person 424 is detected as present in the monitored space 320 (FIGS. 4, 8) (as shown by decision block 536), an indication is provided that a person is present, as shown by block 536. If a person 424 is not detected as present in the monitored space 320 (FIGS. 4, 8), the process continues to monitor the monitored space 320 (FIGS. 4, 8) until a person 424 is present.

As discussed above, with reference to FIG. 5, when the person is substantially motionless and sitting at the computer workstation 426 in zone 322b, the lens array 104 directs a substantially constant amount of thermal energy to the various portions of the thermal sensor module 102. As the person moves from zone 322b to 322c (and beyond), the thermal energy profile being delivered to the various portions of the thermal sensor module 102 changes. This is because of the alternating regions of relatively high output signal and low output signal due to the lens array 104.

More particularly, as the person moves from zone 322b (which may correspond to a first high output signal region in the lens array) to zone 322c (which may correspond to a second high output signal region in the lens array), the person passes through an area that corresponds to a low output signal region of the lens array. This region is represented in FIG. 8 by the vertical dashed line between zone 322b and 322c. As the person walks through the area that corresponds to the low output signal region of the lens array, the thermal profile being delivered to the various portions of the thermal sensor module changes.

Figure 10:
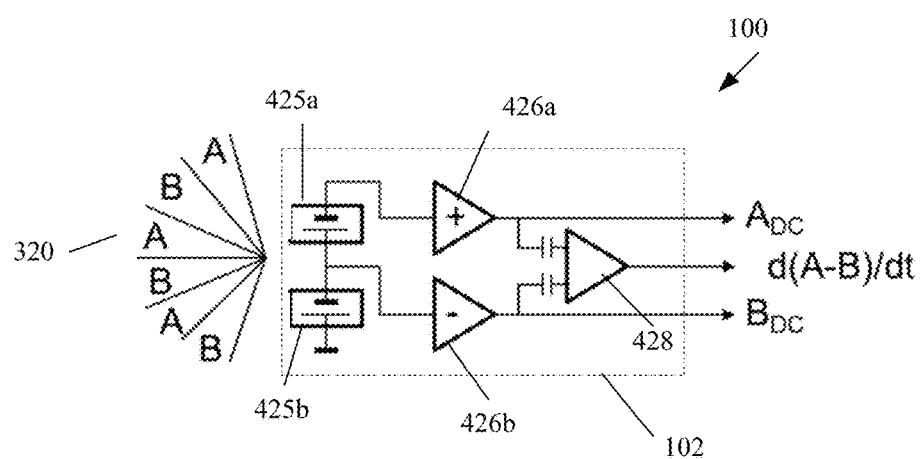
FIG. 10 is a schematic representation of one specific implementation of the detector in FIG. 1 adapted to sense motion within a monitored space.

In a typical implementation, this change can be detected by the processor 302, which can produce an appropriate output. FIG. 10 is a schematic representation showing one specific implementation of the detector 100 in FIG. 1 adapted to sense motion within a monitored space (e.g., 320).

The detector 100 in FIG. 10 has a sensor module 102 with two thermal sensing devices 425a, 425b. The lens array of the illustrated detector 100 divides the monitored space 320 into six discrete zones, each of which is labeled in the illustrated example as "A" or "B." In the example of FIG. 8, zone 322b may be considered an "A" zone, whereas zone 322c may be considered a "B" zone.

The zones labeled "A" in the illustrated example correspond to thermal sensing device 425a, whereas the zones labeled "B" in the illustrated example correspond to thermal sensing device 425b. In other words, the lens array (not shown in FIG. 10) of the illustrated detector 100 directs incident thermal energy from the zones labeled "A" onto thermal sensing device 425a and the lens array of the illustrated detector 100 directs incident thermal energy from the zones labeled "B" onto thermal sensing device 425b.

The output terminals of the thermal sensing devices 425a and 425b are connected as shown to optional output devices 426a and 426b. The output devices 426a and 426b may be amplifiers or any type of electrical coupling. Each output device 426a, 426b produces a D.C.

output (labeled $A_{DC}$ and $B_{DC}$ in the illustrated example) that is proportional to the thermal energy received at a corresponding one of the thermal sensing devices.

Each output device 426a and 426b is connected as shown to a differentiator 428. In a typical implementation, the differentiator 428 comprises circuitry configured to produce an output signal, based in the D.C. outputs ($A_{DC}$ and $B_{DC}$) that represents a rate of change in the difference between the D.C. outputs ($A_{DC}$ and $B_{DC}$). The output signal of the differentiator 428 is labeled "d(A-B)/dt" in the illustrated example.

In a typical implementation, the output terminals of the output devices 426a, 426b and the output terminal of the differentiator 428 are connected to a processor (e.g., 302), which may be part of the integrated circuit 106 in FIG. 1 or may be external to the detector 100 entirely.

It should be appreciated that adding a multi-zone optical element (e.g., the lens array 104 of FIG. 1) to a D.C.-based thermal-detector (e.g., the thermal sensor 102 with one or more thermal sensing devices, as in FIG. 1) provides the advantage that signal changes can be recorded for movements of a living being from one zone to the next.

In general, during operation, the D.C. output of thermal sensing device 425a will increase if a person enters one of the "A" zones in the monitored space 320 (FIG. 8) and will decrease if a person moves out of that "A" zone. Likewise, the D.C. output of thermal sensing device 425b will increase if a person enters one of the "B" zones in the monitored space 320 (FIG. 8) and will decrease if a person moves out of one of the "B" zones in the monitored space 320 (FIG. 8). Therefore, as a person moves from an "A" zone to an adjacent "B" zone, the D.C. output of thermal sensing device 425a decreases and the D.C. output of thermal sensing device 425b simultaneously increases. In a typical implementation, the differentiator 428 produces a time derivative signal from this kind of event that is large and relatively easy to discriminate using relatively basic analog or digital circuitry.

Notably, during operation, the illustrated detector 100 generates a D.C. output even if a person is standing still. This signal can be used to detect presence of a living being and, depending on how the optical zones are arranged, particularly relative to the thermal sensor 102, may also provide additional information on the approximate location of the person.

In some implementations, in addition to detecting motion of a living being throughout a monitored space, the detector 100 is able to determine a direction of motion of the living being. In this regard, once motion is detected, based on a changing profile of thermal energy being delivered to the thermal sensor module 102 from the lens array 104, the direction of motion may be determined by examining exactly how the thermal energy profile is changing at each of a plurality of different thermal sensing devices (or groups of thermal sensing devices). For example if the "A" zone signal change occurs before the "B" zone signal, or if the polarity of the differentiated signal is positive, then the motion is in one direction, whereas if the "B" signal occurs before the "A" signal or the differentiated signal is negative, then the motion is in the opposite direction.

Figure 11:
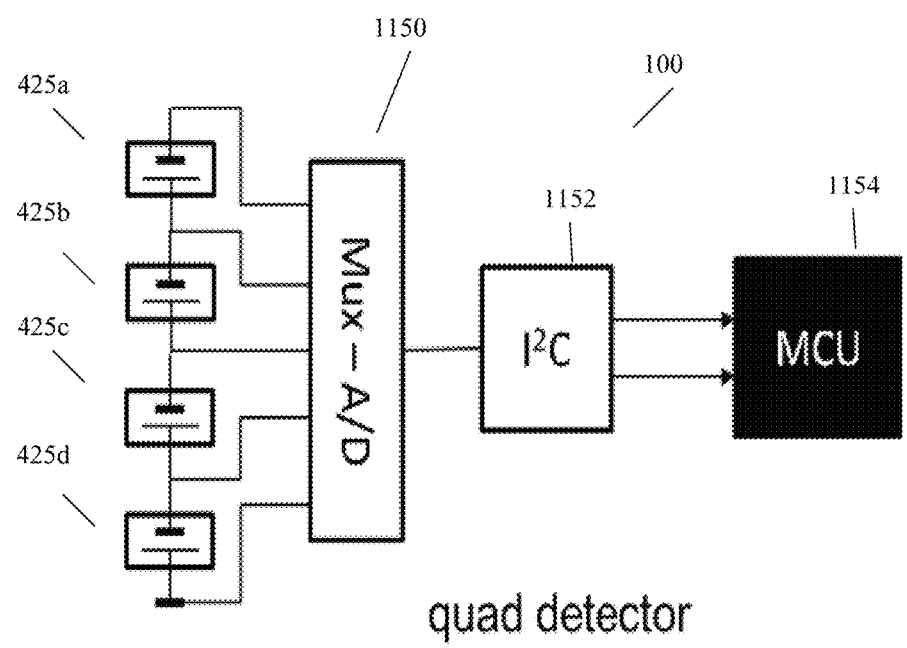
FIG. 11 is a schematic diagram showing an example of a detector.

In some implementations, the processing functionalities of the detector 100 are performed in the digital domain by means of a micro-controller unit (MCU). FIG. 11 is a schematic diagram showing an example of this, where the detector 100 includes four thermal sensing devices 425a-425d. A multiplexer and analog-digital (A/D) converter 1150 transfers the output of the thermal sensing devices 425a-425d into the digital domain and transmits them via an appropriate interface 1152, which in the illustrated example is an I²C bus, to a microcontroller unit (MCU) 1154. The MCU may be outside the sensor itself and part of other equipment (e.g., a TV, computer, mobile device, household good), which hosts the detector 100. In the illustrated implementation, the software application itself typically resides in the MCU and is defined by software code.

A number of embodiments of the invention have been described. Nevertheless, it will be understood that various modifications may be made without departing from the spirit and scope of the invention.

For example, the computer-based processor, the computer-based memory and/or any other electrical circuitry to support the detector functionalities disclosed herein may be located external to the detector itself.

This specification provides many implementation details. However, these should not be interpreted as limitations on the scope of the disclosure or on what may be claimed. Instead, they are descriptions of features specific to particular implementations or embodiments of the disclosure. Certain features described in the context of separate implementations can be implemented in combination in a single implementation. On the other hand, various features that are described in the context of a single implementation can be implemented in different multiple implementations or in any suitable sub-combination of features. Moreover, although features may be described as acting in certain combinations, one or more of these features can in some cases be omitted from the combination.

Similarly, operations are depicted herein as occurring in a particular order. However, this should not be understood as requiring that these operations be performed in the order shown or in a sequential order, or that all operations in fact be performed, to achieve desirable results. In certain instances, multitasking and parallel processing may be implemented and desirable. In addition, some steps of the processes and functionalities disclosed herein may be omitted entirely.

Moreover, the separation of various system components in the implementations described herein should not be understood as requiring such separation in all implementations, and it should be understood that the described components and systems can generally be integrated together in a single product or packaged into multiple products.

The physical dimensions and relative arrangement of components and sub-components can vary considerably. The design of the lens array can vary considerably.

The processor can be adapted to provide additional functionality based on the information it receives from the thermal sensing devices, including providing a measurement of average temperature over all zones, a measurement of the average temperature of an individual zone bundle. The processor can be adapted to control a thermostat for room temperature control, overheating control. The detector 100 can be integrated into a fire detection system. In cases where the transmission window is tuned to the absorption wavelength of a gas (e.g. $CO_2$ at 4.26 µm) gas detection is possible as well.

Figure 12:
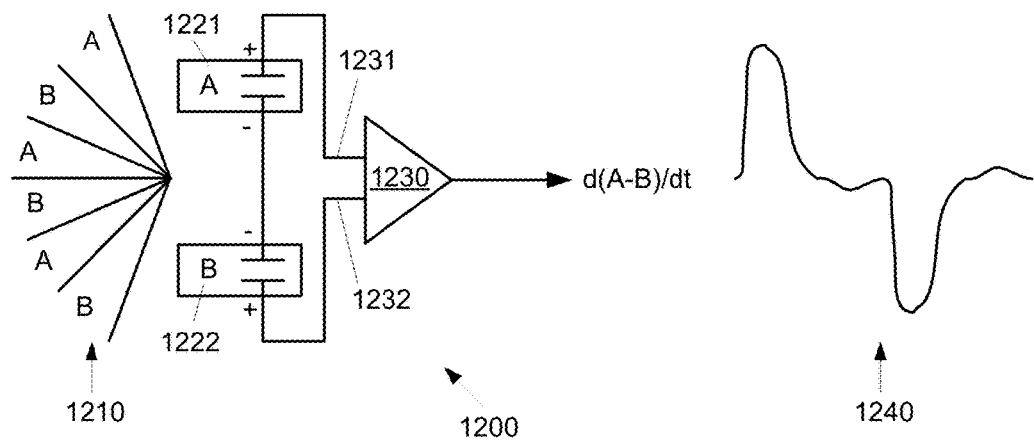
FIG. 12 is a schematic drawing showing a simplified dual-element pyroelectric detector with schematic optics and electronics.

FIG. 12 is a schematic drawing showing a simplified dual-element pyroelectric AC detector 1200 with schematic optics and electronics. For simplicity, the pyroelectric detectors of several of the above embodiments may be modeled as two detector-elements 1221, 1222, which are connected in series with opposite polarities. Zone optics 1210 alternately image the two elements 1221, 1222 into multiple field-of-view (FOV) zones. A moving person in the FOV generates signals alternately on both elements 1221, 1222.

As noted previously, in principle a single element 1221 is also capable of detecting motion if the optics 1210 deliver sufficient amplitude variation on one or more of the sensor elements. This approach was used in early pyroelectric motion detectors when they originally entered the market. An advantage of the dual-element approach is the rejection of signals which are seen by both elements 1221, 1222 at the same time (common-mode rejection of thermal signals). Signals seen by multiple FOV elements typically come from large heat sources, such as the bright sky where clouds are moving, or a window that is opened. Also, if the temperature of the detector is changing due to heat sources, the resulting signal may be dampened and may therefore not trigger a motion event. As a result, more recent Pyroelectric detectors typically use at least two elements to detect motion signals.

The fact that Pyroelectric detectors only react to changing signals means signals from static heat sources fade out with the time constant of the detector and hence do not pose issues with the input range of read-out electronics input. However this behavior may also render the detector to be essentially blind to static heat sources, so non-moving objects are not detected. Pyroelectric detectors are often used as "occupancy" sensors for rooms, such as offices, but in practice they only trigger the "occupancy" signal if there is physical motion in the room.

Figure 13:
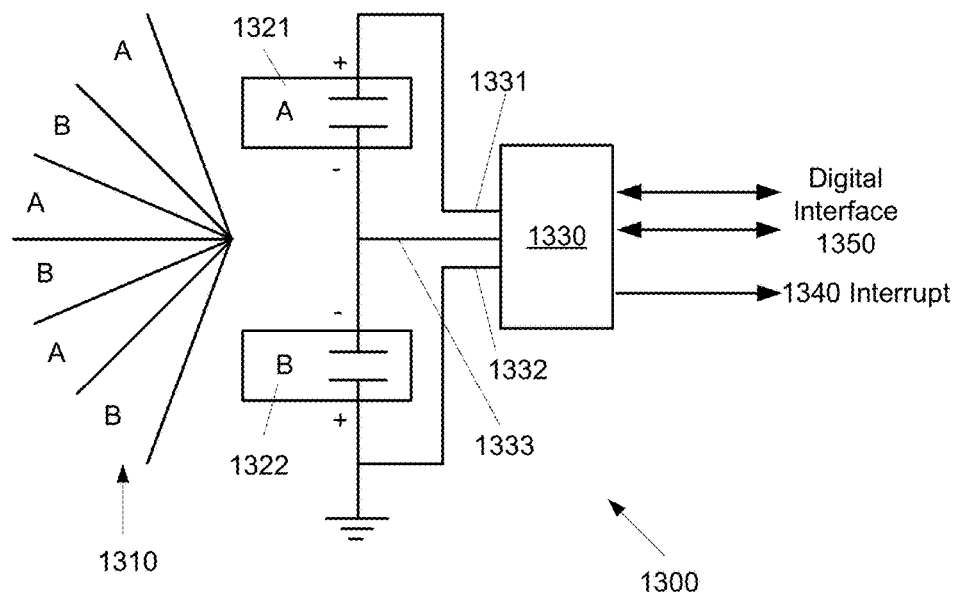
FIG. 13 is a schematic diagram of an embodiment of a direct current (DC) thermal sensor in an anti-polarity serial circuit to achieve both motion and presence detection.

FIG. 13 is a schematic diagram of an embodiment of a direct current (DC) thermal motion and presence detector 1300 having a DC thermal sensor in an anti-polarity serial circuit to achieve both motion and presence detection. The detector 1300 improves the previously presented embodiments of a pyroelectric detector and expands them to become a true motion and presence detector. An object of this embodiment for the detector 1300 is to address modern demands of smart homes and/or offices and smart lighting systems and at the same time employ the concept of state-of-the art microelectromechanical system (MEMS) and microelectronics technology and associated packaging concepts.

In general, the detector 1300 is similar to the AC detector 1200 (FIG. 12), replacing an alternating current (AC) responding pyroelectric material 1221, 1222 with DC thermal sensing elements 1321, 1322, for example, MEMS thermopiles. The schematic is shown in FIG. 13.

Unlike the AC detector 1200 (FIG. 12), the sensing elements, 1321, 1322 (A and B) of the detector 1300 are sensitive to the absolute level of incident radiation and generate a DC signal according this level. Such a sensing element 1321, 1322 has typically been previously employed for the remote measurement of temperatures as in a body-thermometer or an ear-thermometer, but also can serve as a presence detector by sensing the thermal radiation emitted by a (non-moving) human body.

While earlier embodiments have employed sensing elements 1321, 1322 as motion detectors, they may not perform at the same level as the classical pyro-Detectors. Further, the additional DC component provided by sensing elements 1321, 1322 used to perform presence detection, may lead to overflow of the input stage of an associated amplifier or Analog/Digital (A/D) converter 1230 (FIG. 12) in the case of thermal transients which are either due to large heat sources or due to thermal surges by ambient temperature swings.

The AC detector 1200 of FIG. 12 provides a first signal via a first lead 1231 from a positive terminal of the first element 1221 to a differential amplifier 1230, and provides a second signal via a second lead 1232 from a positive terminal of the second element 1222 to the differential amplifier 1230. Likewise, the detector 1300 of FIG. 13 provides a first signal via a first lead 1331 from a positive terminal of the first sensing element 1321 to an electronic circuitry 1330, and provides a second signal via a second lead 1332 from a positive terminal of the second sensing element 1322 to the electronic circuitry 1330. In alternative embodiments, the polarity of the terminals of the first and second sensing devices 1331, 1332 may be reversed.

To overcome the input-stage overflow in the AC detector 1220 of FIG. 12, the detector 1300 arranges the first sensing element 1321 and the second sensing element 1322 in series with reversed polarity, and provides a center lead 1333 from a negative terminal of each of the first sensing element 1321 and the second sensing element 1322 to the electronic circuitry 1330. The electronic circuitry 1330, for example, an application specific integrated circuit (ASIC) or field programmable gate array (FPGA), may therefore read either the resulting signal of the dual-element assembly or the output signal of each of the first sensing element 1321 and the second sensing element 1322 individually.

The electronic circuitry 1330 may be configured to read the true differential output of an assembly containing the dual sensing elements 1321, 1322. In this configuration, the detector 1300 may capture motion signals in a similar fashion as the pyroelectric AC detector 1200 (FIG. 12). The output signal of the dual-element arrangement of the detector 1300 includes the difference of the signals generated by the dual sensing elements 1321, 1322. If both of the dual sensing elements 1321 and 1322 detect the same thermal flow, the output is zero. Multi-zone optics 1310 segment the FOV in the same way as in the optics 1210 of the pyroelectric AC detector 1200 (FIG. 12), imaging a moving object through the zone pattern alternatively on the sensing elements 1321 and 1322. The output signal is then free from DC offsets and may be amplified to larger levels, for example, by the electronic circuitry 1330 without the danger of exceeding a signal limit (e.g., overloading the circuit).

In addition, the electronic circuitry 1330 may be configured to read the first sensing element 1321 only or the second sensing element 1322 only, and then determine the true DC level of incident radiation. This setting is similar to the previously described embodiments with the difference that the optics 1310 in the detector 1300 focuses alternatively on the first sensing element 1321 only or the second sensing element 1322 only, whereas in previous embodiment, the optics may be designed to modulate the incoming signal onto the same sensor element.

AC Pyroelectric detectors 1200 are generally configured to sense motion in switching units or alarm systems. The function is largely determined through the materials and the assembly. Output signals of Pyro-materials are comparably large, so a simple read-out circuit that has been available for decades could perform the task providing the motion sensing trigger signal.

The employment of the detector 1300 requires much more sophisticated electronics, which have only recently become available. The signal levels of the sensing elements 1321, 1322 are smaller than the signal levels of the AC detector 1200 pyroelectric sensors 1221, 1222. For example, with newer generation electronics it is possible to resolve signal level differences in the 100 nV range at equal signal-to-noise ratio as for the AC detectors 1200. Typical full range dynamic ranges for DC detectors is in the +/− 5 to 50 mV range. The DC offset in the sensing elements 1321, 1322 makes it particularly difficult to achieve a good resolution and dynamic range of the incoming radiation level. The hardware based electronic circuitry 1330 described above, may be configured to suppress DC values for the detector 1300 in motion detection mode, and at the same time allow the measurement of the incoming DC level of the thermal radiation for presence detection and/or remote temperature measurement.

Advantages of the DC thermal motion and presence detector 1300 over Pyroelectric detectors 1200 (FIG. 2) include smaller size, ease of assembly, and improved functionality. Regarding size, MEMS-based thermal detectors (thermopiles or bolometers) can be made much smaller than pyroelectric crystals. For example, pyroelectric crystals generally have a larger size (typical sensitive area >1 mm$^2$) in order to have sufficient sensitivity to the low motion frequencies needed to detect moving people. Thermal DC sensors by nature have this low frequency ability regardless of size.

Regarding ease of assembly, thermal MEMS sensing elements 1321, 1322 may be produced in silicon-processing (CMOS) wafer fabrications. The devices come in form of small dies which may then be cut out of the silicon wafer. These dies, together with the readout and processing electronics circuit 1330, such as an ASIC die, can be more easily packaged by means of standard packaging technologies than sensors using pyroelectric materials (e.g. PZT or LiTa). This allows scaling to higher volumes.

Regarding functionality, the DC detector 1300 has greater functionality than the AC detector 1200, since the AC detector 1200 is limited to simple motion detection. By evaluating the DC component of the incoming thermal radiation, the DC detector 1300 may additionally perform presence detection of stationary people or remote temperature sensing.

The DC detector 1300 may be configured to be sensitive to radiation in, for example, but not limited to, the wavelength range between 3 µm and 20 µm (or a portion thereof). The sensing elements 1321, 1322 may be, for example, but not limited to, MEMS infrared sensors, thermopiles, bolometers, and/or infrared intrinsic or extrinsic semiconductors.

The optics 1310 may be infrared transmissive multi-zone optics provided through a multi-lens array (ground or molded lenses), a molded Fresnel-lens array, or a combination of a multi-lens and Fresnel lens array. An appropriate pattern in or on the IR optics 1310 on the detector 1300 may represent one of or a combination of Fresnel lens array, a Fresnel zone array, holographic optical elements (HOE), diffractive optical elements, binary optical elements, or any diffraction, refraction or holographic pattern in or on the optical window that is able to provide multi-zone images of the sensing elements 1321, 1322.

The multi-zone optics 1310 may be, for example, configured as multiple images of the sensor (array) into the object space, alternative imaging and blocking regions, and/or the forms of the zones are arbitrary. For example, the optics 1310 may have a checkerboard-like pattern, but zoning may also be achieved by having ring patterns. The pattern for the optics 1310 is not restricted to any of these examples.

The electronic circuitry 1330 may contain software library elements that may define one or more applications and possibly provide an interrupt signal at an interrupt line 1340. The electronic circuitry 1330 may be configured to look for a peak pattern of certain height and frequency that is typical for motion of people in the FOV. Similarly, the electronic circuitry 1330 may be configured to look for DC signal patterns that indicate the presence of a person, for example, a stationary person. The electronic circuitry 1330 may evaluate zone change patterns under motion and determine direction of movement. A multi-element sensor, for example a quad sensor, may be advantageous since it can provide motion vectors in two directions or angles. The electronic circuitry 1330 may measure an average temperature over all zones of the FOV, measure an average temperature of an individual zone bundle, provide thermostat control of room temperature, provide overheating control, and/or provide fire detection, among other functions. If the optics 1310 and/or sensing elements 1321, 1322 are tuned to the absorption wavelength of a gas, for example of $CO_2$ at 4.26 µm, among others, the detector 1300 may also detect the presence of the gas.

Applications of the detector 1300 may include, but are not limited to for example, light switching and control, intruder alarms, display switching and control (e.g. television, computer, and mobile devices), household goods, home appliances, automotive applications, smart home applications, and or gesture recognition, among others.

What is claimed is:

1. An apparatus configured to sense presence and motion in a monitored space, the apparatus comprising:
 a dual-element assembly further comprising a first thermal sensing element paired with a second thermal sensing element, each of the first and second elements further comprising a first terminal having a first polarity and a second terminal having a second polarity;
 a lens array coupled to the first and/or second thermal sensing element, wherein the lens array comprises a plurality of lenses, each of which is configured to direct incident thermal energy from a respective one of a plurality of optically-defined spatial zones located within the monitored space onto the first and/or the second thermal sensing element; and
 an electronic circuitry in electrical communication with the dual-element assembly and configured to read a resulting signal of the dual-element assembly and an individual output signal of each the first thermal sensing element and the second thermal sensing element,
 wherein each of the first and second thermal sensing elements is operable to produce a direct current output that is substantially proportional to an amount of thermal energy being received at each thermal sensing element, and the electronic circuitry, the first thermal sensing element and the second thermal sensing element are electrically connected at a connection point comprising their first terminals or their second terminals.

2. The apparatus of claim 1, wherein the electronic circuitry further comprises a digital interface.

3. The apparatus of claim 1, wherein the electronic circuitry further comprises an interrupt terminal.

4. The apparatus of claim 3, wherein the electronic circuitry is configured to react to a signal on the interrupt terminal denoting motion, presence and/or a temperature level and/or pattern.

5. The apparatus of claim 1, wherein the electronic circuitry further comprises an analog to digital converter.

6. The apparatus of claim 1, wherein the first thermal sensing element and the second thermal sensing element each further comprise one of the group consisting of a microelectromechanical system (MEMS) infrared sensor, a thermopile, a bolometer, and/or an infrared intrinsic or extrinsic semiconductor.

7. The apparatus of claim 1, wherein the lens array produces alternating regions of relatively high output signal to the incident thermal energy and regions of relatively low output signal to the incident thermal energy.

8. The apparatus of claim 7, wherein the regions of relatively low output signal are at edges of the lenses or between the lenses in the lens array.

9. The apparatus of claim 7, wherein the regions of relatively low output signal correspond to virtual dividing lines between the spatial zones within the monitored space.

10. The apparatus of claim 1, wherein the lenses of the lens array are selected from the group consisting of Fresnel lens arrays, Fresnel zone arrays, holographic optical elements, diffractive optical elements, refractive optical elements, binary optical elements, and grid patterns.

11. The apparatus of claim 1, wherein the lenses are optical patterns not physically locatable over the lens array.

12. The apparatus of claim 1 further comprising a computer-based processor coupled to the electronic circuitry and a computer-based memory storage device coupled to the processor,
 wherein the memory storage device stores instructions that, when executed by the processor, cause the processor to determine, based on data received from the first and/or second thermal sensing elements, whether there is a living being present in or moving about the monitored space.

13. The apparatus of claim 8, wherein the first and/or second thermal sensing elements, the lens array, the processor and the memory storage device are contained in a single chip level package.

14. The apparatus of claim 1, wherein a first lens of the lens array is configured to the direct incident thermal energy from a corresponding one of the physical zones in the monitored space onto a first one of the thermal sensing elements and onto a second one of the thermal sensing elements.

15. The apparatus of claim 1, wherein a first lens of the lens array is configured to direct the incident thermal energy from a corresponding first one of the physical zones in the monitored spaces onto the thermal sensing element, but not the second thermal sensing element, and wherein a second lens of the lens array is configured to direct the incident thermal energy from a corresponding second one of the physical zones in the monitored space onto the second thermal sensing element, but not the first thermal sensing element.

16. The apparatus of claim 1, wherein the first and/or second thermal sensing elements are sensitive to radiation having a wavelength between 4 µm and 20 µm.

17. The apparatus of claim 1 adapted to determine a temperature value over a total of the monitored space by evaluating an overall incoming thermal signal strength.

* * * * *